United States Patent Office 3,268,979
Patented August 30, 1966

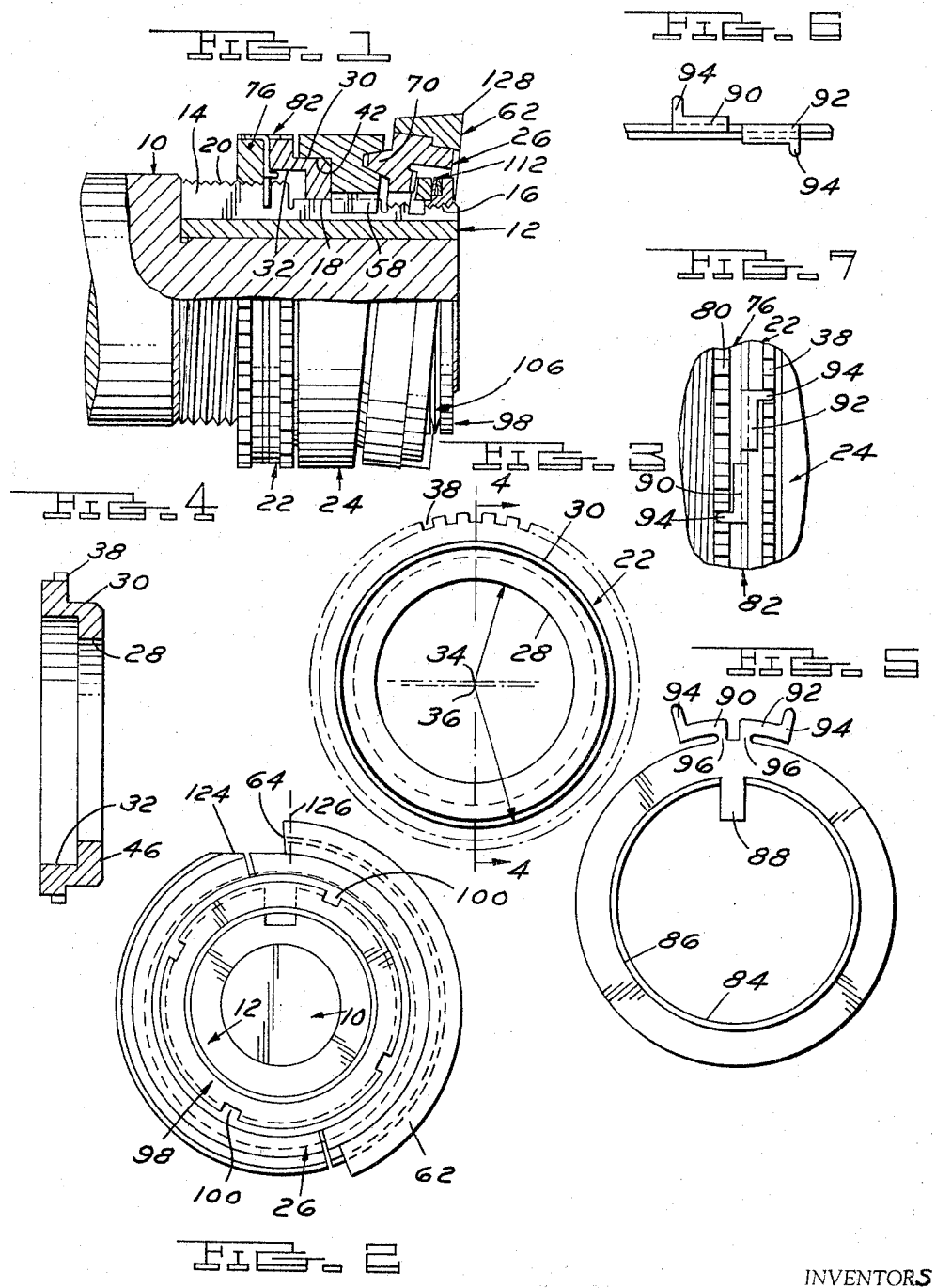

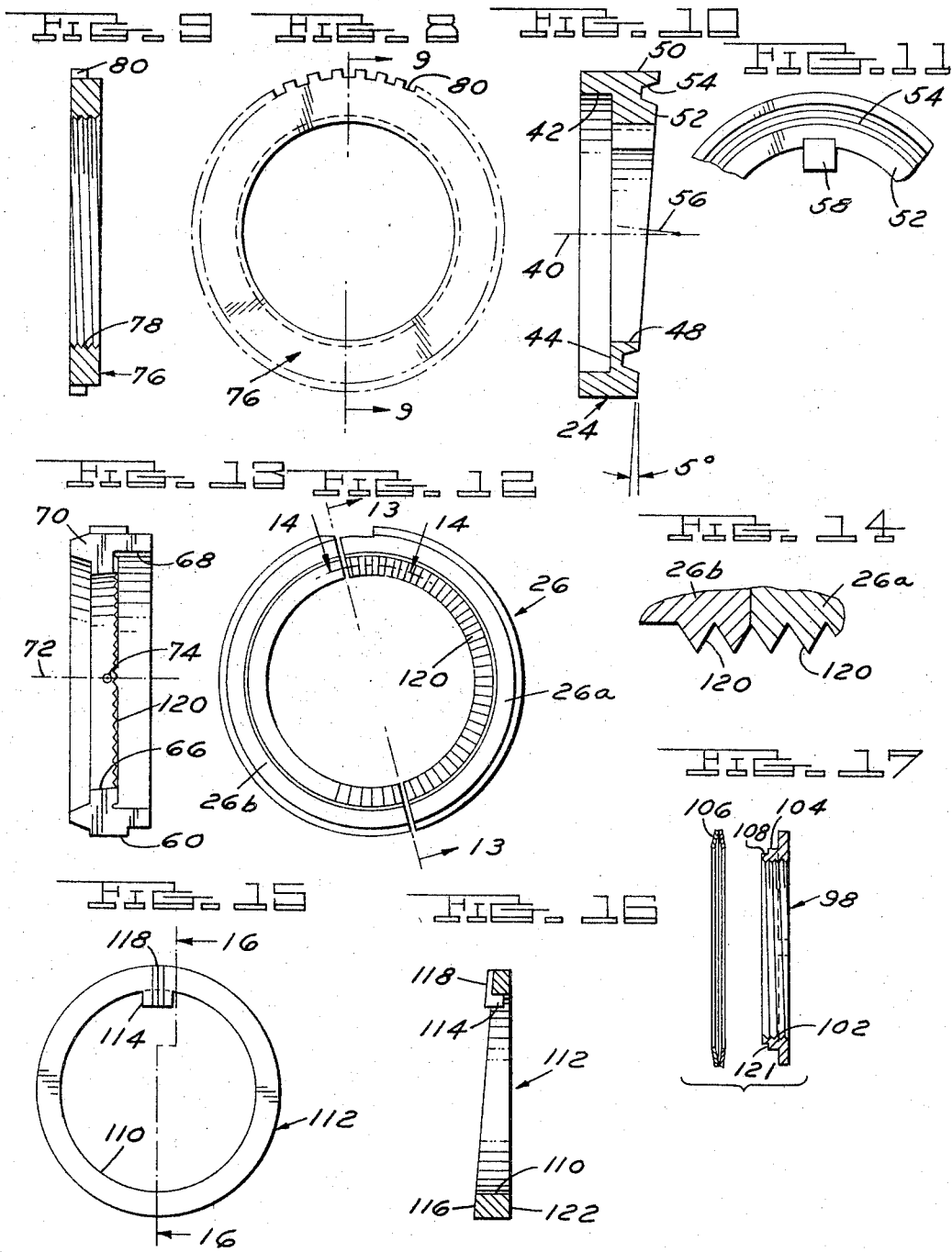

3,268,979
CUTTING TOOL
James W. Stewart, Detroit, and Orval A. Opperthauser, Bloomfield Township, Oakland County, Mich., assignors to F. Joseph Lamb Co., Warren, Mich., a corporation of Michigan
Filed Apr. 3, 1964, Ser. No. 357,184
20 Claims. (Cl. 29—101)

This invention relates to a cutting tool, and more particularly to a tool bit of the circular segment form and a holder therefor.

It is an object of this invention to provide a cutting tool which comprises in combination a tool bit of the circular segment type and a holder therefor which enables repeated sharpening of the cutting edge of the tool bit and adjustment of the cutting edge of the tool bit so that it can be repositioned in exactly the same location with respect to the work being done as it was prior to resharpening.

A further object of the invention is to provide a spindle construction for supporting a tool bit of the circular segment type which enables the cutting edge of the tool bit to be adjusted radially, axially and circumferentially.

Further objects and advantages of the cutting tool of this invention will be apparent from the following description and drawings in which:

FIG. 1 is a fragmentary, side-elevational view partly in section of the cutting tool of this invention.

FIG. 2 is an end view of the cutting tool shown in FIG. 1.

FIG. 3 is an end view of the eccentric ring embodied in the tool.

FIG. 4 is a sectional view along the line 4—4 in FIG. 3.

FIG. 5 is a plan view of the spring retainer prior to bending the spring tabs.

FIG. 6 is a fragmentary view of the spring retainer shown in FIG. 5, with the spring tabs bent into position.

FIG. 7 is a fragmentary view of the tool in the vicinity of the spring retainer illustrated in FIGS. 5 and 6.

FIG. 8 is a plan view of the adjusting nut embodied in the tool.

FIG. 9 is a sectional view along the line 9—9 in FIG. 8.

FIG. 10 is a cross-sectional view of the collar incorporated in the tool.

FIG. 11 is a fragmentary, end-elevational view of the collar shown in FIG. 10.

FIG. 12 is an end view of the composite tool bit holder ring.

FIG. 13 is a sectional view taken along the line 13—13 in FIG. 12.

FIG. 14 is a fragmentary sectional view taken along the line 14—14 in FIG. 12.

FIG. 15 is a plan view of the retainer ring embodied in the tool.

FIG. 16 is a sectional view along the line 16—16 in FIG. 15.

FIG. 17 is a sectional view of the spring washer and clamping nut.

Referring to the drawings, and particularly to FIG. 1, the cutting tool of the present invention is illustrated as including a spindle 10 on the reduced end of which is mounted a sleeve 12 which is fixedly retained on the end of spindle 10 by any suitable means. Sleeve 12 is formed with a keyway 14 and has a stepped outer cylindrical surface comprising a threaded portion 16, an intermediate smooth surface 18 and a larger threaded portion 20. Sleeve 12 supports an assembly of essentially three rings, namely, an eccentric ring 22, a collar 24 and a tool bit holder ring 26.

The eccentric ring 22 is illustrated in detail in FIGS. 3 and 4. Ring 22 has a central aperture 28 having a diameter such as to provide a smooth sliding fit on the smooth cylindrical surface 18 of sleeve 12. Ring 22 is fashioned with an axially extending shoulder 30 which is eccentric with respect to central aperture 28 and is also provided with a counterbore 32 concentric with aperture 28. Thus, as illustrated in FIG. 3, the center about which the central aperture 28 and the counterbore 32 are generated is indicated at 34 and the center about which shoulder 30 is generated is indicated at 36. The outer periphery of ring 22, which is also concentric with central aperture 28, is fashioned with a series of notches 38. Ring 22 is supported on the cylindrical surface 18 of sleeve 12 for rotation as well as axial sliding movement.

Collar 24 is shown in detail in FIGS. 8, 9 and 10. The collar has a central axis which is designated 40 and a counterbore 42 concentric with the axis 40. Counterbore 42 is dimensioned to have a snug rotatable fit on the shoulder 30 of eccentric ring 22. The inner end 44 of counterbore 42 is adapted to seat solidly against the end face 46 of eccentric ring 22. The central aperture 48 and the outer cylindrical surface 50 of collar 24 are likewise concentric about the central axis 40 of the collar. The end face 52 of collar 24 which is opposite the end in which the counterbore 42 is formed is inclined to the axis 40 of the collar at an angle which is slightly non-perpendicular. For example, in the embodiment illustrated, end face 52 is inclined to the axis 40 at an angle of about 5°. There is formed in the end face 52 an annular groove 54 having tapered side walls as illustrated. Groove 54 is eccentric with respect to the axis 40 and is concentric to the axis 56, which within the axial extent of collar 24 is spaced slightly from axis 40 and is inclined thereto so that the axis 56 is normal to the plane of the end face 52. Within the central aperture 48 there is arranged a key 58 which has a sliding fit in the keyway 14 in sleeve 12.

The tool bit holder ring 26 is illustrated in detail in FIGS. 12, 13 and 14. In the arrangement illustrated, ring 26 is formed of two circular segments 26a and 26b. The forming of this ring in two halves is preferred for reasons which will be apparent later, but the ring may be formed as one integral piece if desired. The outer surface of ring 26 is of cylindrical, stepped configuration, as indicated at 60, and this outer stepped surface is adapted to support a cemented carbide tool bit 62. Tool bit 62 is retained on ring 26 by brazing, soldering, or other suitable means. As is shown in FIG. 2, tool bit 62 is fashioned as a circular segment having an arcuate extent of less than 180°. The cutting edge of tool bit 62 is indicated at 64. Ring 26 has a central aperture 66, and at one face thereof is fashioned with counterbore 68. The opposite face of ring 26 is formed with an annular rib 70 which is adapted to seat in groove 54 on collar 24, as is illustrated in FIG. 1. Rib 70 is concentric with the central axis 72 of collar 24, and when the ring 26 is assembled with collar 24 the axis 72 coincides with the axis 56 about which the groove 54 on collar 24 is concentric. Likewise, when ring 26 is assembled with collar 24 the coincident axes 56, 72 intersect the axis 40 of collar 24 at the point 74 on the axis 72. Thus, with this arrangement, it will be appreciated that with the members 22, 24 and 26 assembled as shown in FIG. 1, if ring 22 is rotated, the eccentric shoulder 30 on ring 22 will cause the cutting edge 64 of the tool bit 62 to be shifted radially.

The means for adjusting the ring assembly axially on the spindle comprises a circular nut 76 which is located adjacent the axially inner face of ring 22. Nut 76, which is shown in detail in FIGS. 8 and 9, has a threaded central bore 78 and the outer periphery of the nut is formed with a plurality of successive notches 80 which are similar to the notches 38 formed around the outer periphery of eccentric ring 22. A spring retainer 82 is interposed between nut 76 and ring 22. Retainer 82, which is illustrated in FIGS. 5, 6 and 7, has a central opening 84 defined by an axially extending flange 86 which engages the counterbore 32 of ring 22. At its inner periphery, retainer 82 is also formed with a key 88 which is engaged in keyway 14 of sleeve 12. At its outer periphery, retainer 82 is formed with two spring tabs 90, 92 which are bent axially in opposite directions, as shown in FIGS. 6 and 7. These tabs terminate in ears 94 which are adapted to engage in the notches 38 and 80 of the ring 22 and nut 76, respectively. Each of the tabs 90, 92 is connected with the peripheral edge of retainer 82 by a reduced neck portion 96. Neck portions 96 provide a resilient connection between each tab and the retainer ring, so that although the ears 94 are normally engaged with the notches 38, 80, either or both of the tabs may be lifted to retract the ears 94 from their notches to permit rotation of either or both nut 76 and collar 24. Thus, retainer 82 releasably retains nut 76 and collar 24 in the positions to which they are rotatably adjusted.

At the axially outer end of sleeve 12 there is arranged a circular clamping nut 98 provided with notches 100 around its periphery to accommodate a spanner wrench. Nut 100 has its central aperture threaded as at 102 for threaded adjustment on the threaded portion 16 of sleeve 12. The axially inner face of nut 98 is formed with a shoulder 104 which receives a spring washer 106 and with a second shoulder 108 of smaller diameter than shoulder 104. The smaller shoulder 108 of nut 98 is dimensioned to fit snugly within the inner periphery 110 of an end ring 112, which is located on the threaded portion 116 of sleeve 12 axially intermediate the tool bit holder ring 26 and spring washer 106. End ring 112 has a radially inwardly projecting key 114 which is adapted to engage with keyway 14 on sleeve 12 to prevent rotation of end ring 112 on the sleeve. The end face 116 of ring 112 which is axially adjacent ring 26 is inclined at an angle slightly nonperpendicular to the central axis of the ring. More specifically, in the embodiment illustrated, the end face 116 of ring 112 is inclined to correspond with the inclination of the face 52 of collar 24. At the location of lug 114 the inclined face 116 of ring 112 is fashioned with a radially extending projection or tooth 118, and the adjacent face of ring 26 is formed at the bottom of counterbore 68 with a plurality of circumferentially spaced, radially extending grooves or teeth 120 which are adapted to be engaged by tooth 118 on ring 112. The spring washer 106 biases nut 98 and ring 112 in a direction axially apart. However, it will be noted that when nut 98 is tightened, radial shoulder 121 of nut 98 engages against the end face 122 of end ring 112, so that in the tightened condition of the assembly spring washer 106 has no function. On the other hand, if nut 98 is loosened, then spring washer 106 will tend to retain end ring 112 pressed axially against the base of counterbore 68 in ring 26, and thus prevent the ring 26 from freely rotating on the end of the spindle.

Referring to FIG. 2, it will be noted that adjacent the cutting edge 64 of tool bit 62 the tool bit holder ring 26 is machined as at 124, to provide the necessary clearance for cutting edge 64. In the arrangement illustrated the cutting tool may be considered as designed for use as a boring tool. With such an arrangement, if the cutting edge 64 becomes dull, it may be resharpened by simply grinding back the end portion of the tool bit 62 on which the cutting edge 64 is formed. For example, the tool bit may be reground along the broken line designated 126 in FIG. 2. With the tool so reground, it will be obvious that the corner 128 of the cutting edge 64 will have been shifted circumferentially, radially and axially relative to the same corner of the cutting edge prior to grinding. With the construction herein illustrated, the reground cutting edge 126 can be shifted to the same position occupied by the cutting edge 64 before resharpening by simply rotating ring 26 an extent corresponding to the amount of material measured circumferentially that was removed from the tool bit in resharpening. In other words, if ring 26 is rotated so that the cutting edge 126 is shifted to the plane occupied by the cutting edge 164, the corner 128 of the new cutting edge 126 will occupy the same position radially, circumferentially and axially as did the corner 128 of cutting edge 64. This is true because ring 26 is circular and is rotatable on collar 24 about its central axis 72.

While in the illustrated embodiment the cutting tool is shown for use as a boring tool, it will be appreciated that in the construction herein provided the tool bit could also be formed with a particular contour, so that it would function as a form tool rather than a simple boring tool. In the case of a form tool, for example, where the particular configuration of the tool bit is cut on the workpiece, the need for circumferential, radial and axial adjustment of the tool bit is obvious. To initially adjust the tool radially, it is merely necessary to lift the ear 94 on tab 92 so as to free the eccentric ring 22 and rotate the ring 22 slightly. The eccentric shoulder 30 on ring 22 will thus shift collar 24 radially, and since ring 26 is centered on collar 24, the tool bit 62 will be correspondingly shifted radially. In this way, the effective diameter of the bore or other configuration being cut can be controlled.

As indicated previously, the cutting edge 64 can be shifted circumferentially by merely rotating ring 26 relative to collar 24. However, rotation of ring 26 will shift the cutting edge 64 not only circumferentially but radially and axially as well. The axial adjustment of the cutting edge 64 can be effected by lifting tab 94 on ear 90 and rotating nut 76 so as to shift the nut axially of the spindle and thereby shift the corner 128 of the tool bit axially to the desired position. Thus the arrangement herein illustrated enables adjustment of the tool bit accurately and easily in radial, axial and circumferential directions.

The tool bit holder ring 26 in the arrangement illustrated is shown formed as two circular segments merely for convenience in using the cutting tool. By forming the ring 26 as two semi-circular segments, if it is desired to remove the tool bit, it is only necessary to back off nut 98 sufficiently to permit the two halves 26a and 26b of the tool bit holder ring to be disengaged from collar 24.

It will be appreciated that if desired sleeve 12 may be omitted and the cylindrical sections 14, 16 and 18 formed directly on the end of the spindle 10. Likewise it will be appreciated that in the arrangement illustrated the inclination imparted to the tool bit 62 is desirable, so that the necessary clearance required at the cutting edge is obtained.

We claim:
1. A cutting tool comprising a spindle having a cylindrical end portion, a tool bit holder ring rotatably supported on said end portion of the spindle, a tool bit in the form of a circular segment mounted on said holder, said holder ring having an inner diameter greater than the diameter of the end portion of said spindle, an eccentric ring rotatably supported on the end portion of the spindle and operatively connected with the holder ring such that when the eccentric ring is rotated, the holder ring is shifted radially on the end portion of the spindle, and means threaded on the end portion of the spindle for clamping the ring assembly in an axially fixed position on the spindle.

2. The combination called for in claim 1 wherein said last-mentioned means comprises a pair of rings threaded on the end portion of the spindle, one adjacent each end of the ring assembly, said pair of rings being threaded on the spindle for axial adjustment to thereby permit adjustment of the tool bit axially of the spindle.

3. The combination called for in claim 1, wherein the holder ring is inclined at an acute angle to the axis of the spindle and the tool bit has a cutting edge which is radially disposed and extends generally axially of the spindle.

4. The combination called for in claim 1, including means for releasably retaining said eccentric ring in any circumferentially adjusted position.

5. The combination called for in claim 1, including means for releasably retaining said holder ring in any circumferentially adjusted position.

6. The combination called for in claim 1, wherein said eccentric ring has an inner diameter corresponding generally with the diameter of the end portion of the spindle and an external shoulder eccentric with the inner diameter of the eccentric ring, and including means connecting said holder ring with the shoulder on the eccentric ring.

7. A cutting tool comprising a spindle having a cylindrical end portion, a series of three rings on said end portion of the spindle, the axially innermost ring comprising a ring supported on the spindle for rotative adjustment about the axis of the spindle and having a circumferential external shoulder thereon which is eccentric to the axis of the spindle, the next adjacent ring comprising a collar rotatably supported by said shoulder and the axially outermost ring comprising a tool bit holder rotatably supported by said collar such that relative rotation between the collar and the eccentric ring causes the tool bit holder to shift radially relative to the axis of the spindle, a circular segment tool bit mounted on said holder and means for fixedly clamping said ring assembly on the end of the spindle.

8. The combination called for in claim 7, wherein the collar is keyed to the spindle to prevent rotation thereof relative to the spindle.

9. The combination called for in claim 7, wherein the axially outer face of the collar is inclined to the axis of the spindle at an acute angle, said end face including a shoulder thereon, said holder ring being supported by the last-mentioned shoulder for rotation about an axis normal to said inclined face.

10. The combination called for in claim 9, wherein the tool bit is concentric with the axis of rotation of the tool bit holder and has a cutting edge which is radially disposed and extends generally axially, whereby when said holder ring is rotated the cutting edge of the tool bit is shifted axially.

11. The combination called for in claim 9, wherein said shoulder on the collar comprises an annular groove in said inclined face, said holder ring having on the axially inner face thereof an annular rib seated in said groove.

12. The combination called for in claim 9, wherein said collar is fashioned on the axially inner face thereof with a counterbore in which the shoulder on the eccentric ring is seated.

13. A cutting tool comprising a spindle having a cylindrical end portion, an assembly of three axially adjacent ring members on the end portion of the spindle, the center ring comprising a rotatably fixed collar which is shiftable axially and radially of the spindle, said collar having its axially inner face lying in a plane perpendicular to the axis of the spindle and its axially outer face lying in a plane inclined slightly non-perpendicular to the axis of the spindle, the ring next adjacent said collar inwardly of the spindle being rotatable on the spindle and having a shoulder thereon which is eccentric to the axis of the spindle and on which the collar is radially supported, the axially outer ring comprising a tool bit holder, said tool bit holder being rotatably supported by said collar for rotation about an axis perpendicular to the inclined face of the collar, the axis of rotation of the tool bit holder intersecting the axis of the spindle within the axial extent of the tool bit holder, a circular segment tool bit mounted on the outer periphery of the holder and having a cutting edge which is radially disposed and extends in a generally axial direction and means for securely mounting said ring assembly in axially fixed position on the spindle.

14. The combination called for in claim 13, wherein the holder ring is formed as two half circular segments and the tool bit is mounted on one of the half-segments.

15. The combination called for in claim 13, wherein said last-mentioned means includes a pair of members threaded on the end portion of the spindle, one at each end of the opposite ends of the ring assembly.

16. The combination called for in claim 15, wherein said threaded members can be advanced axially of the spindle to thereby adjust the position of the tool bit axially of the spindle.

17. The combination called for in claim 16, including a pair of retainer rings keyed to the shaft and disposed one between the eccentric ring and the adjacent theaded member, and the other between the holder ring and the adjacent threaded member, the first retainer ring having means thereon for locking the adjacent threaded member against rotation and the second retainer ring having means thereon for locking the holder against rotation.

18. The combination called for in claim 17, wherein the periphery of the eccentric ring and the periphery of the adjacent threaded member are serrated and the retaining ring therebetween is fashioned with a pair of resilient tabs engageable with the serrated peripheries of the eccentric ring and the adjacent threaded member.

19. The combination called for in claim 17, wherein the adjacent faces of the holder and the adjacent retaining ring are fashioned with inter-engaging detent and groove means for rotatably locking the holder to the adjacent retaining ring.

20. The combination called for in claim 17, including a spring washer disposed between the last-mentioned retaining ring and the adjacent threaded member and urging them axially apart.

No references cited.

WILLIAM W. DYER, Jr., *Primary Examiner.*

HARRISON HINSON, *Examiner.*